United States Patent [19]

Miserlis et al.

[11] 4,265,223

[45] May 5, 1981

[54] METHOD AND APPARATUS FOR UTILIZING SOLAR ENERGY

[75] Inventors: Constantine D. Miserlis, Arlington; Albert G. Luke, Jr., Stoneham, both of Mass.; Walter Laber, Deggendorf; Friedrich Guetlhuber, Metten, both of Fed. Rep. of Germany

[73] Assignees: The Badger Company, Inc., Cambridge, Mass.; Deffendorfer Werft und Eisenbau, Deggendorf, Fed. Rep. of Germany

[21] Appl. No.: 943,373

[22] Filed: Sep. 18, 1978

[51] Int. Cl.³ .............................................. F24J 3/02
[52] U.S. Cl. .................................... 126/435; 126/452; 126/438; 126/437; 126/417; 60/641 AD
[58] Field of Search ............... 126/435, 436, 437, 430, 126/438, 417, 452; 60/641, 659, 676; 165/104 S, 18

[56] References Cited

U.S. PATENT DOCUMENTS

| | | | |
|---|---|---|---|
| 1,951,403 | 3/1934 | Goddard | 126/435 |
| 3,903,699 | 9/1975 | Davis | 126/435 X |
| 3,950,949 | 4/1976 | Martin et al. | 60/676 X |
| 4,063,546 | 12/1977 | Schmid et al. | 126/437 X |
| 4,065,053 | 12/1977 | Fletcher et al. | 60/641 |
| 4,117,682 | 10/1978 | Smith | 60/659 |
| 4,143,814 | 3/1979 | Hill, Jr. | 126/437 X |
| 4,146,057 | 3/1979 | Friedman et al. | 126/435 X |
| 4,164,123 | 8/1979 | Smith | 60/641 |
| 4,172,491 | 10/1979 | Rice | 126/435 X |

Primary Examiner—James C. Yeung
Assistant Examiner—Larry Jones
Attorney, Agent, or Firm—Schiller & Pandiscio

[57] ABSTRACT

A process and system are provided for economic utilization of solar energy. Solar energy is absorbed and converted to thermal energy by means of at least two systems, operating in different temperature ranges, for circulating a primary fluid heat transfer medium through separate collector sections of a solar receiver to recover solar heat and through separate output heat exchangers to supply heat to a second heat transfer medium functioning as a working medium, with heat storage means being associated with each system for the purpose of satisfying the heat requirements of the working fluid and also to prevent cooling down of the collector during the time that little or no solar radiation is available.

25 Claims, 7 Drawing Figures

METHOD AND APPARATUS FOR UTILIZING SOLAR ENERGY

This invention relates to solar energy conversion systems and more particularly to systems for collecting solar energy and converting it to other forms of usable energy through the use of a fluid heat transfer medium.

BACKGROUND OF THE INVENTION

It has long been recognized that the sun is a vast source of clean energy and that it can and should be exploited to reduce dependence on fossil fuels. However, systems heretofore available for collecting and utilizing solar energy have not been sufficiently economical to complete effectively with fossil fuels.

One approach that has been taken to enhance cost-effectiveness involves providing (1) a receiver located on a tower or on a hill and (2) a mirror field comprising a plurality of adjustable mirrors situated on the ground and arranged to reflect the sun's rays towards the receiver. The receiver consists of one or more collectors and energy conversion means for collecting the incident radiant energy and converting it to heat. The mirrors, also known as heliostats, are continually repositioned by a servo-tracking system during each day as well as seasonally so as to compensate for relative movement between the sun and earth and thereby contantly direct the reflected solar energy at the receiver. The tracking system may be adapted to compensate for movement of the receiver due to various factors, notably wind loading. The heat energy produced as a consequence of absorption of incident solar radiation by the receiver is recovered by absorbing it in fluid heat transfer medium and passing the latter to or through a heat storage vault or through a consuming device which may take various forms such as a hot water heater or steam producer or turbo-electric generator. It has been suggested that the recovered heat may be stored by absorbing it in a heat storage media of fluid or solid form, e.g. eutectic salts or a bed of stones. Examples of systems embodying centralized energy receivers, mirror fields, servo-controlled sun-tracking heliostats, heat storage tanks, and use of fluid heat transfer media for utilizing absorbed solar energy are disclosed by U.S. Pat. Nos. 4,063,543, 4,044,753, 4,034,735, 4,031,444, 4,021,895, 4,091,495 and 4,013,885.

The prior art solar energy collection and utilization systems do not adequately accommodate and compensate for the fact that the amount of energy from the sun arising at the earth's surface is not constant but will vary with the amount of cloud cover and the time of day. Also the time between sunrise and sundown will vary from day to day. Accordingly if the recovered solar energy is utilized immediately to generate steam from water, a number of disadvantages are incurred. If the steam is used to drive an electrical power generator, the latter must be continually started up and shut down in accordance with the amount of available steam since the latter cannot be stored. This is most uneconomical since the efficiency of a turbine installation is very low when operating under reduced or intermittent loads which lie outside of its design parameters. Furthermore, in such a system the receiver will experience temperatures ranging from that of the boiler feedwater up to the temperatures to which steam is required to be heated for efficient turbine-driving purposes (usually between about 900°–1200° F.), and often it has temperatures even above the usual range of superheated steam. Hence should the incident solar radiation be interrupted, the receiver or at least portions thereof will be cooled from the highest steam temperature in the system down to the lowest boiler feedwater temperature. As a result of this drop, stresses and even shocks are produced in the materials of construction of the receiver. Similar stresses are produced as a result of the large temperature increase which occurs when the receiver is again illuminated with solar radiation.

This problem of thermally-induced stresses exists even if the recovered solar energy is used to generate steam through an intermediate heat transfer medium which permits at least temporary storage of the recovered heat and is capable of being heated high enough to permit production of 900°–1200° F. steam. In this connection it should be noted that using a working fluid other than steam to operate a turbo-generator is not favored since most are designed to be operated by steam.

These thermally-induced stresses, which occur repeatedly, adversely affect the life span of the receiver and may even affect the performance of associated equipment. Since the capital cost of a solar plant of the type described is very high, its useful life must be quite long, typically at least twenty years, in order for the plant to be economically feasible. However, in solar plants of prior design the stresses created by sharp changes in the amount of incident solar radiation are of sufficient magnitude and frequency as to drastically foreshorten the useful life of the receiver or necessitate frequent and expensive shutdowns for repair. Other problems with prior systems employing a centralized energy receiver mounted above and some distance from the heliostats is that dispersion of the reflected beams, due to pointing or other factors, tends to dilute the solar flux so that some of it may not reach the target area of the receiver and/or so that a precise uniformity of flux distribution over the target area of the receiver is not obtainable. While making the target area of the receiver larger will help in intercepting more of the solar energy reflected by the heliostats, it also involves larger receiver construction and maintenance costs. Moreover, since making the target area larger does not provide greater uniformity of flux distribution, an increase in temperature differentials across the receiver (sometimes with an attendant reduction in overall conversion efficiency) is a likely result of increasing the size of the target area. Hence, the problem of stresses is not avoided by making the receiver larger and in fact it is desirable to avoid building larger receivers so as to reduce weight and improve the resistance to wind loading, whereby to achieve a relatively good structural strength-to-cost ratio.

OBJECTS AND SUMMARY OF THE INVENTION

In view of the state of the prior art, a general and primary purpose of this invention is to provide an improved method and system for collecting and utilizing solar energy which is reliable and capable of operating satisfactorily over the long life expected of utilities facilities.

A further object is to provide a method and system for the purpose described which has enhanced energy conversion and utilization capabilities, low operating costs and no fuel requirements, and is capable of driving the turbine section of a turbo-electrical generator within its design limits.

Still another object is to provide an energy collection and utilization method and system for effectively competing with systems employed in collecting and utilizing energy extracted from fossil fuels.

Another object is to provide a novel system and method for converting radiant solar energy to thermal energy which involves substantially preventing the receiver from undergoing larger and frequent excursions of temperature, whereby to reduce stresses and shock due to changes in temperature and extend the useful life of the receiver.

A further object is to provide a method and system whereby heat recovery is effected by a fluid heat transfer medium which is used in a mode which facilitates profitable operation of a power plant.

These and other objects and advantages are achieved by using a primary fluid heat transfer medium which is contained in at least two separate circulating systems having different operating temperature ranges, and a secondary fluid heat transfer medium which functions as a working medium and, by exchange of heat with the primary heat transfer medium in the separate circulating systems, is brought stepwise up to a relatively high temperature suitable for subsequent purposes, e.g., driving the turbine section of a turbo-generator so as to produce electricity. The conditions necessary for efficient turbine operation and avoidance of large temperature fluctuations in the receiver are achieved by associating heat reservoirs with each circulating system so that the primary heat transfer medium in each circulating system may be circulated in a mode which transfers heat (a) to the reservoir in times of high solar energy flux, (b) to the receiver in times of scant solar energy flux, (c) to the secondary fluid from the receiver in times of high solar energy flux, and (d) to the secondary fluid from the reservoir in times of scant solar energy flux. In addition a curtain or door may be provided for closing off the target area of the receiver during times of scant or no incident solar energy flux so as to reduce heat loss from the receiver to the environment. Other features and aspects of the invention are revealed or made obvious by the following detailed description and claims in light of the accompanying drawings.

BRIEF DESCRIPTION OF THE DRAWINGS

In the drawings, like numerals refer to like parts.

DETAILED DESCRIPTION OF THE INVENTION

As employed herein, the terms "solar energy", "radiant energy" and "solar flux" are intended to denote those portions of the electromagnetic wave energy spectrum, within or outside of the visible range, which emanate from the sun and which may be converted by absorption to thermal energy.

Figure 1:
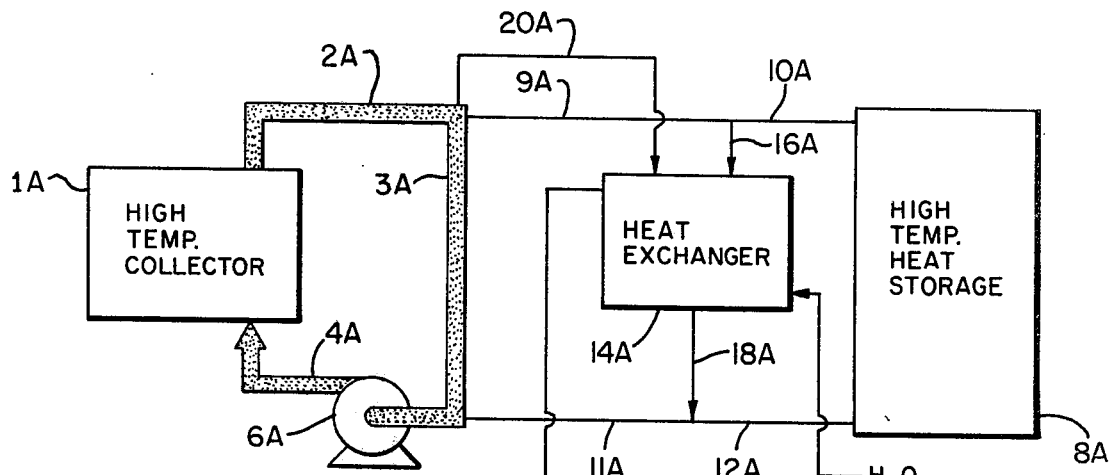
FIG. 1 is a schematic diagram of the invention.

FIG. 1 is a schematic representation of the invention. Essentially it involves the provision in a receiver of two collectors (or a single collector having two discrete sections) as represented at 1A and 1B, with each collector essentially comprising a heat exchanger through which a primary fluid heat exchanger medium may be circulated to recover or give up heat as hereinafter described. Each collector is connected into a separate fluid heat transfer medium circulating system, with the system associated with collector 1B being operated within a higher temperature range than the system associated with collector 1A. Each circulating system has a recycle loop comprised of lines 2A, 3A and 4A or 2B, 3B and 4B between the inlet and outlet of the heat exchangers of the associated collector and a pump as shown at 6A and 6B for circulating the medium through each system. Additionally each circulating system comprises a heat storage unit 8A or 8B connected by lines 9A, 10A or 9B, 10B and 11A, 12A or 11B, 12B to the outlet and inlet sides respectively of the associated collector heat exchanger 1A or 1B and loops 2A, 3A, 4A or 2B, 3B, 4B. Each circulating system also includes a secondary heat transfer medium heat exchanger 14A or B having its heat input section connected by lines 16A or 16B and 18A or 18B to the lines 9A, 10A or 9B, 10B and 11A, 12A or 11B, 12B as shown. Additional lines 20A and 20B connect the lines 2A and 2B to the heat input sections of heat exchangers 14A and 14B respectively. A secondary or working fluid heat transfer medium is circulated via lines 21, 22 and 23 through the heat output sections of heat exchangers 14A and B so as to recover heat from the primary heat transfer medium.

The same or a different material may be used in the two circulation systems as the primary heat transfer medium; however, the latter is a material which is a liquid at the temperatures at which it is transported through its circulation system. Preferably it is a molten salt or a eutectic salt mixture with characteristics suited to the temperature range encountered in its movement between the collector 1A or 1B, storage unit 8A or 8B and the secondary heat transfer medium heat exchanger 14A or 14B. Although not shown in FIG. 1, the system also includes other structural elements such as valves, auxiliary piping and control instrumentation for carrying out the process embodied in the invention, as hereinafter described.

A basic requirement of the process is that the two circulating systems be operated at near but different temperature ranges and the working secondary heat transfer medium be heated stepwise by heat exchangers 14A and 14B. Additionally the primary heat transfer medium in each system is circulated continuously through the loop 2A, 3A, 4A or 2B, 3B, 4B, as the case may be, in sufficient quantity to maintain a relatively small difference between its temperature at the return and discharge sides of the collector. Finally, the primary heat transfer medium in each circulating system is circulated so as to transfer heat from the collector to the storage unit when the amount of heat recovered from received solar energy exceeds the heat input requirements of the working fluid, and also so as to transfer heat from storage to the collector when solar radiation is reduced or absent in an amount sufficient to hold the collector temperature relatively constant.

For a solar power plant where the secondary working fluid is steam which is used to drive the turbo-generator, it is preferred that the primary fluid heat transfer medium in the circulating system associated with collector 1A be circulated so that it have temperatures of about 950° F. and about 1000° F. at the collector's inlet and outlet respectively, and the heat transfer medium in the second circulating system be maintained with temperatures at the inlet and outlet of collector 1B of about 1150° F. and about 1200° F. respectively. Of course, depending upon the heat requirements of the secondary fluid, other temperature limits may be maintained in the two circulating systems, e.g. between about 800° and 900° F. in the system for collector 1A and between about 950° and 1050° F. in the second circulating system.

In all modes of operation the process requires that the primary fluid heat transfer medium in each circulation system be continuously circulated in the system's recycle loop 2A, 3A, 4A or 2B, 3B, 4B. In normal daytime operation, some of the heat transfer medium in each circuit is passed by lines 9A, 16A or 9B, 16B to heat exchanger 14A and 14B, and a corresponding amount of the same medium is returned to line 4A or 4B via lines 18A, 11A, or 18B, 11B, whereby the hot medium in line 3A is mixed with that in line 11A and the hot medium in line 3B is mixed with that in line 11B, with desired inlet and outlet temperatures at the collector inlet and outlet being achieved by appropriately proportioning the flow rates in loops 2A, 3A, 4A, and 2B, 3B, 4B with the flow rates in the secondary loops 9A, 16A, 18A, 11A and 9B, 16B, 18B and 11B respectively. The system is sized so that in normal daytime operation more heat is generated in the collector than is required to be consumed by the secondary working fluid in exchangers 14A and 14B. This excess heat is stored by passing some of the hot fluid heat transfer medium in lines 2A, 9A and 2B, 9B through lines 10A and 10B to the heat reservoirs 8A and 8B respectively, and a corresponding amount of relatively cold heat transfer medium is removed from the heat storage units and returned via lines 12A, 11A and 12B, 11B to lines 4A and 4B respectively.

In the event of temporary cloud cover whereby the recovered solar thermal energy is insufficient to satisfy the heat requirements of the secondary working fluid, the heat deficiency is made up by feeding relatively hot fluid heat transfer medium from the storage units 8A and 8B to the exchangers 14A and 14B via lines 10A, 16A and 10B, 16B respectively. Corresponding amounts of primary heat transfer medium are returned to the storage units via lines 18A, 12A and 18B, 12B respectively. During this time, flow continues as during normal daytime operation in the loops 2A, 3A, 4A, and 9A, 16A, 18A, 11A of one circulating system and in the corresponding loops 2B, 3B, 4B, and 9B, 16B, 18B, 11B of the other system.

In the event of darkness or when cloud cover is sufficiently dense and permanent that practially no energy is collected from the sun, substantially all of the heat required by heat exchangers 14A and 14B is provided by heat reservoirs 8A and 8B respectively. During this mode of operation, hot heat transfer medium is transferred from the heat storage units to the collectors via lines 10A, 9A, 3A, 4A and 10B, 9B, 3B, 4B, and a corresponding amount of the same medium is removed from the loops 2A, 3A, 4A and 2B, 3B, 4B respectively. Since the temperature of the medium in lines 2A and 2B at the outlet of the collectors is only minimally below the temperature of the medium in lines 4A and 4B at the inlet of the collector, the medium in lines 2A and 2B may be used to supply heat to the working fluid. Therefore during this mode of operation heat transfer medium is continually transported by lines 20A and 20B to heat exchangers 14A and 14B respectively where it is cooled by indirect heat exchange with the working fluid. This cooled stream of heat transfer fluid is passed from heat exchangers 14A and 14B to heat storage reservoirs 8A and 8B via lines 18A, 12A and 18B, 12B respectively.

The advantages of a system as represented in FIG. 1 are as follows: (1) during times of peak solar energy, excess heat can be recovered by removing a relatively cool stream of primary heat transfer medium from its storage area and passing it through the associated collector to pick up heat and then back to the storage area for later retrieval and use as required; (2) the near constant temperature differential maintained between each collector's inlet and outlet reduces thermal stresses due to avoidance of large temperature gradients across the expanse of the collector; (3) keeping the collectors at a substantially constant level avoids the large thermal stresses that otherwise would be produced by large changes in the intensity of solar radiation; (4) by utilizing two circulation system with different temperature ranges it is possible to extract relatively large amounts of heat for increased power generation without subjecting the collectors and the primary heat transfer medium to large temperature excursions; and (5) by using different temperatures and different materials as the primary heat transfer medium in each circuit, it is possible to (a) select a heat transfer medium that is especially suited for a particular operating temperature range, and (b) to use a relatively inexpensive fluid heat exchange medium and relatively low cost structural metal members in the lower temperature circuit and a more expensive heat transfer medium and structural members as required in the higher temperature circuit. In this connection it is to be noted that usually the higher the operating temperature of a fluid handling system, the more expensive will be its construction and the more critical will be the nature and handling of the materials employed. Hence, another significant advantage is that the higher temperature circulation system may be made much smaller in size, especially if its output heat exchanger is employed merely as a final stage steam superheater.

Figure 2:
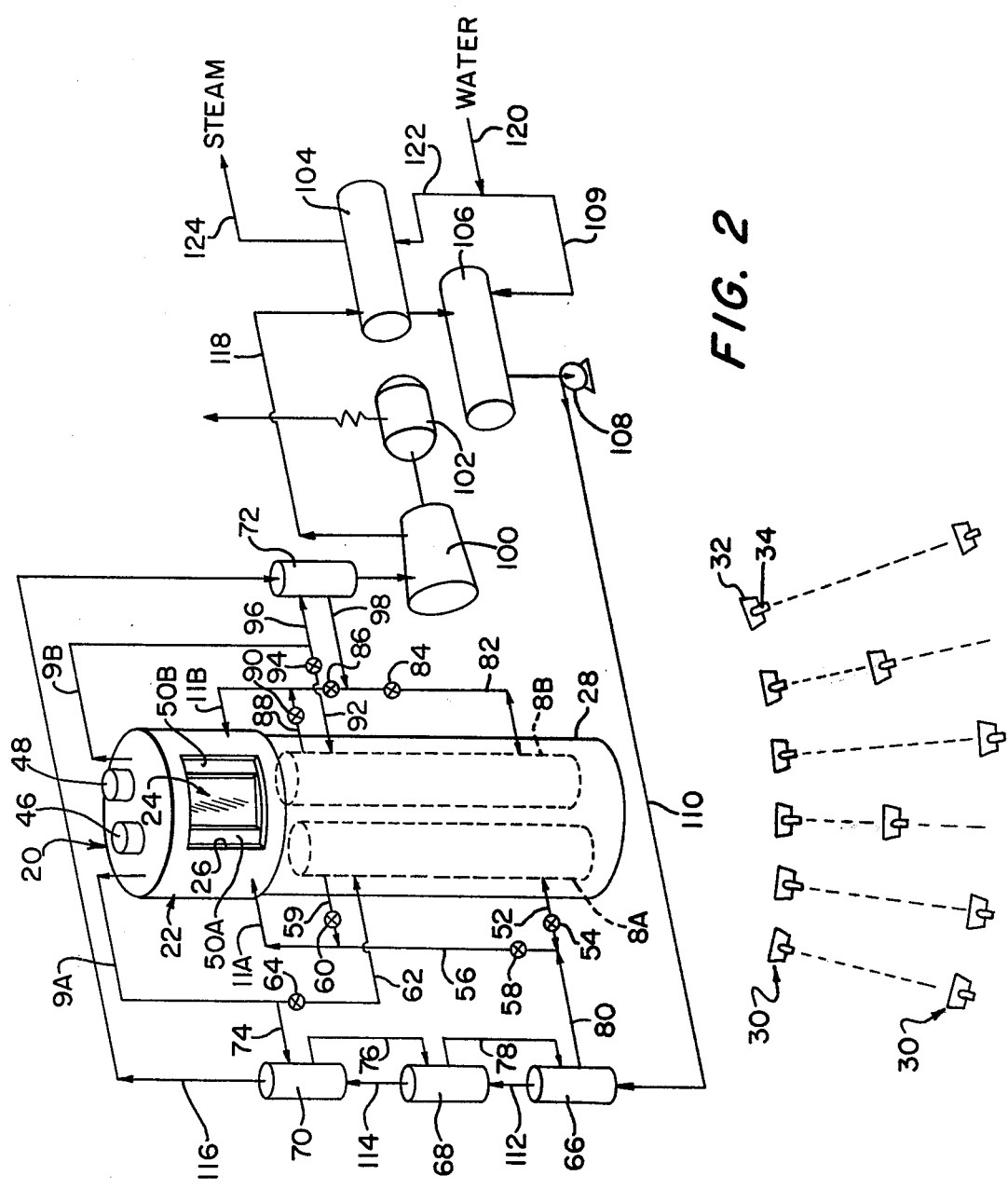
FIG. 2 is a perspective and diagrammatic view of a solar energy collection and utilization system which embodies the principles of the present invention and includes a central receiver disposed above a field of individual heliostats and provided with doors for its target area.

FIG. 2 illustrates a solar energy collection and utilizing system which constitutes a preferred embodiment of the invention. This embodiment comprises a receiver 20 comprising a housing 22 which contains a collector panel 24 for absorbing solar energy via an aperture 26, a support 28 supporting the receiver above the surface of the earth, and a mirror field made up of a plurality of undivided heliostats 30. Although not shown in detail, it is to be understood that each heliostat includes a reflecting surface 32 and servo-positioning means 34 for dynamically moving the reflecting surface so as to maintain the reflected rays from the sun directed toward the target area presented by the collector panel 24 of the receiver when sun light is available. The servo positioning means necessarily must be operated to continuously compensate for the relative movement between the sun and earth during daylight hours and seasons. The servo-positioning means for each heliostat may have its own sun sensor(s) for detecting relative movement of the sun and earth and determining the direction and extent of reflector movement required to maintain the reflected solar energy directed at the target area of the receiver, e.g. like the heliostats disclosed in U.S. Pat. No. 4,063,543. Alternatively a single central sun tracker and a computer may be used to sense relative movement between the sun and earth and to provide positioning signals for individually controlling operation of the servo-positioning means of the several heliostats. Since the design, function and control of heliostats are well known, a further detailed description of the heliostats is omitted in the interest of brevity. However, it is to be understood that various forms of heliostats, e.g. those with flat or curved reflectors, may be employed in the practice of this invention.

The collector panel may take various forms, but at the very least it comprises a target surface for absorbing solar energy as heat and at least two heat exchangers in heat-exchanging relation with said energy-absorbing means, with each heat exchanger forming part of a separate circuit for circulating a primary heat transfer medium.

Figure 3A:
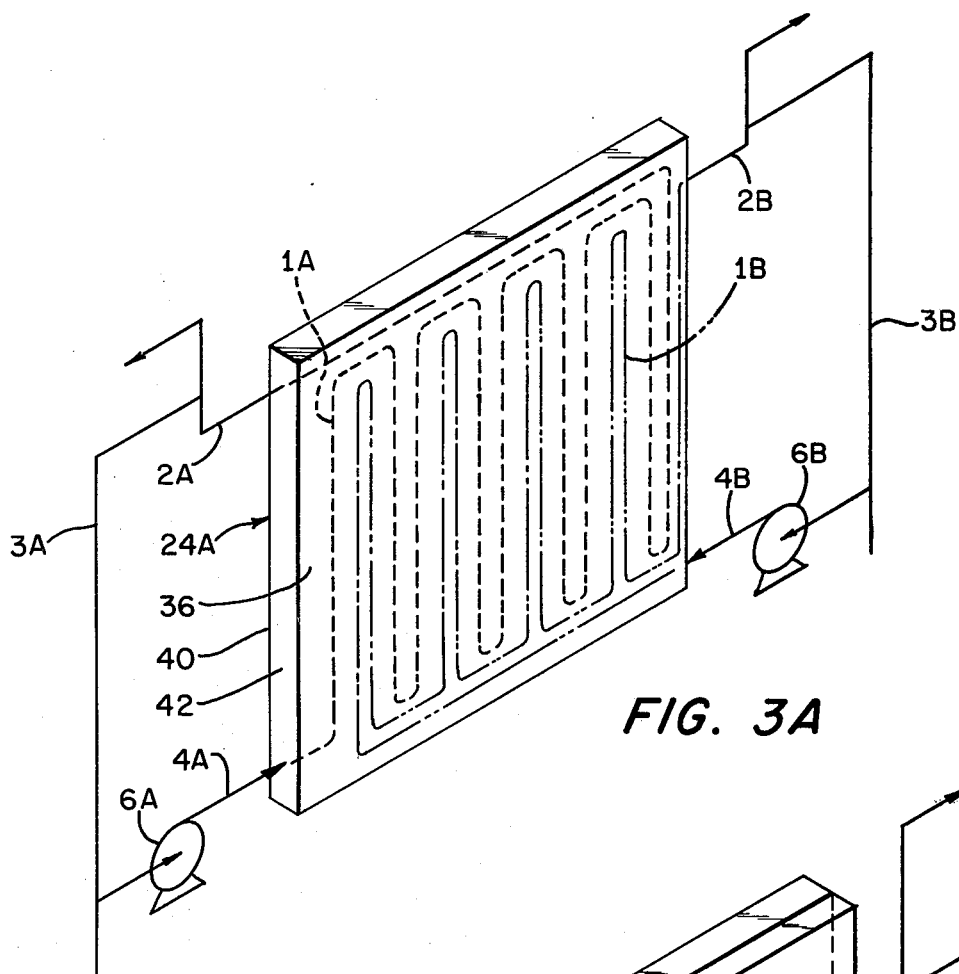
FIGS. 3A and 3B are enlarged schematic views of two forms of solar collectors useable in the receiver of the system of FIG. 2.
Figure 3B:
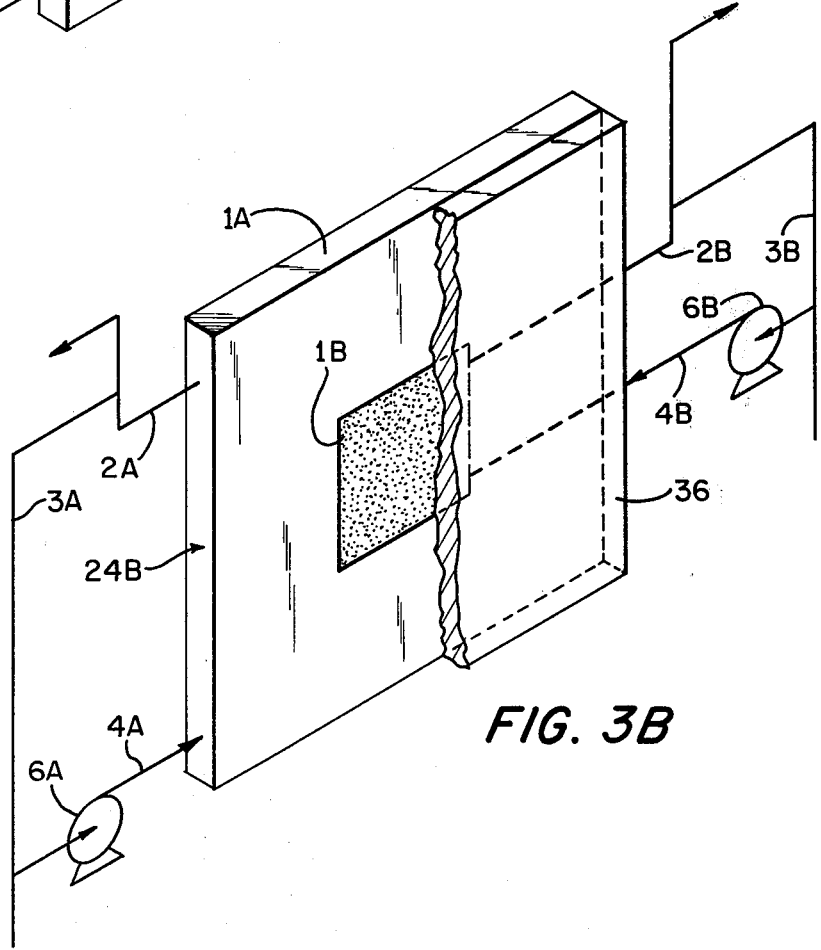

In the preferred embodiment of the invention shown in FIGS. 2, 4, 5 and 6, the collector panel comprises two heat exchangers. However, it is to be understood that the receiver may have additional heat exchangers with each one forming part of a separate circuit for a primary heat transfer medium. FIGS. 3A and 3B illustrate two different forms of collectors 24 that may be employed in a receiver according to this invention.

As seen in FIG. 3A, the collector panel 24A comprises a front surface 36 which (a) serves as the target at which the beam of radiant energy from each heliostat is directed and (b) preferably is made so that it has a high radiant energy absorption efficiency, low emissivity and high thermal conductivity. Thus, target surface 36 may be a sheet of aluminum with a dark, light-absorbing coating on its front side. In the preferred embodiment shown in FIG. 3A, collector panel 24A also comprises two heat exchangers 1A and 1B in heat-exchanging relation with target surface 36. In this case the heat-exchangers comprise conduits which are arranged so as to form serpentine coils of generally similar shape disposed adjacent to and co-planar with one another, whereby a fluid heat transfer medium circulating through the coil of one heat exchanger will exchange heat with substantially the same area of the target surface as will occur when a fluid heat transfer medium is circulated through the coil of the other heat exchanger. The conduits may take the form of pipes mounted behind and in heat-exchanging relation with the target surface. The pipes may be exposed on the rear side of the collector or the solar panel may include a back wall 40 and side walls 42 embodying the pipes. Alternatively the conduits may be passageways demarcated by the partitions extending between the front and back wall 36 and 40. The inlets and outlets of collectors 1A and 1B are connected to lines 4A, 4B and 2A, 2B respectively as shown.

FIG. 3B shows another form of collector that may be used in the system of FIG. 2. In this case the collector 24A has two heat exchangers represented schematically as 1A and 1B which are disposed so that exchanger 1B collects heat from a selected center area of the target surface 36 and exchanger 1A collects heat from the area of the target surrounding the center area. The target surface 36 may be an integral and essential part of the heat exchangers or, as shown in FIG. 3B, it may be a separate sheet or panel attached to and in conductive heat transfer with the two exchangers.

Although not shown, it is to be understood that the heat exchangers in the receiver may be disposed other than as shown in FIGS. 3A and B, e.g., each of the two heat exchangers may remove heat from one half of the target surface, with each such half extending from top to bottom or side to side. Preferably, however, the exchangers are disposed so that each removes heat from the same area of the target surface, as in the design of FIG. 3A. It is to be understood also that each of the heat exchangers 1A and 1B may be made up of two or more heat exchanger sections connected in series or in parallel with each other.

The pumps 6A and 6B and the lines 2A, 3A, 4A and 2B, 3B, 4B making up the two recycle loops are contained within the receiver, with the pumps 6A and 6B preferably being driven by separate electric motors 46 and 48 respectively mounted to the receiver.

In the usual installation it is preferred that the receiver housing be insulated to reduce radiative heat losses and that the aperture 26 be closed off during periods of darkness or when the sun is occluded by clouds for a substantially time. Accordingly, a pair of side-wise moving doors 50A and 50B are mounted in the receiver. FIG. 2 shows the doors partially closed, while the doors are fully open in FIG. 5 and fully closed in FIG. 6. Although not shown in FIG. 2, it is to be understood that an electrically powered door operator unit is mounted in the receiver for moving the doors to open or closed position on command.

Referring now to FIG. 2, the receiver support 28 is preferably a closed hollow structure and disposed within it are separate heat storage units 8A and 8B, one for each heat exchanger in the receiver. Specific details of construction of the heat storage units are omitted since such devices are well known in the art and the form of construction may vary according to the needs of different installations. Suffice it to state that each heat storage unit is capable of storing relatively large quantities of a fluid heat transfer medium and is insulated against loss of heat. By way of example but not limitation, each storage unit may comprise an insulated storage tank made of a material which is inert to the fluid heat transfer medium.

The bottom end of storage unit 8A is connected by lines 52 and 56 and valves 54 and 58 to return line 11A of exchanger 1A of collector 24. The upper end of storage unit 8A is connected by a line 59 and a valve 60 to line 11A. Still another line 62 and a valve 64 connect discharge line 9A to the upper end of storage unit 8A. Also associated with heat exchanger 1A are three working fluid heat exchangers 66, 68 and 70, with exchanger 66 functioning as a feedwater preheater, exchanger 68 functioning as a primary steam generator, and exchanger 70 functioning as a first steam superheater. A fourth working fluid heat exchanger 72, which functions as a second steam superheater, is associated with heat exchanger 1B of collector 24. Exchangers 66, 68, 70 and 72 may be of any suitable design, e.g., shell and tube units. In any event it is to be appreciated that each has heat input section and a heat output section. The return side of the heat input section of exchanger 70 is connected by a line 74 to lines 62 and 9A, while its discharge side is connected in series with the return side of the heat input section of exchanger 68 by a line 76. Another line 78 connects the discharge and return sides of the heat input sections of exchangers 68 and 66. The discharge side of the heat input section of exchanger 66 is connected by a line 80 to lines 52 and 56.

The bottom end of storage unit 8B is connected by a line 82 and valves 84 and 86 to the return line 11B of heat exchanger 1B. The upper end of the same storage unit is connected by a line 88 and a valve 90 to line 11B. Still another line 92 and a valve 94 connect the discharge line 9B of collector exchanger 1B to the upper end of storage unit 8B. Line 9B also is connected by a line 96 to the return side of the heat input section of working fluid heat exchanger 72, while the discharge side of the same heat input section is connected by a line 98 to lines 82 and 11B.

Still referring to FIG. 2, the preferred embodiment of the invention comprises a turbine 100 connected in driving relation with an electrical power generator 102, a heat exchanger 104 which functions as an export steam generator, a collection drum 106, and a pump 108. Makeup boiler feedwater is supplied by a line 109 to collection drum 106 as required. Water collecting in drum 106 is passed by pump 108 and lines 110, 112, 114, 116 through the heat output sections of heat exchangers 66, 68, 70 and 72 in the order named, with water being preheated to nearly its boiling point in exchanger 66 and substantially all of the water being converted to steam in generator 68. This steam is superheated in exchangers 70 and 72 and then it is passed through turbine 100 so as to cause the latter to operate generator 102. As the steam is discharged from the turbine it passes via a line 118 and the return side of the heat input section of exchanger 104 back to collection drum 106. Boiler feedwater is circulated via lines 120 and 122 through the heat output section of exchanger 104, whereby the boiler feedwater is converted to steam as a consequence of recovery of heat from the spent superheated steam passing out of the turbine. The steam produced in exchanger 104 is exported for use in another existing facility, e.g., a petrochemical processing plant or a water desalination unit.

As noted above, the same or different materials may be used as the primary fluid heat transfer medium circulated through the two collector heat exchangers 1A and 1B and the primary heat transfer medium is preferably a molten salt or a salt mixture which remains in the liquid phase throughout the range of high temperatures encountered in the circulation system. One salt mixture that may be used is eutectic sodium nitrate/sodium nitrate. Still other high temperature salts are known to persons skilled in the art. Molten metals also may be employed as the primary heat transfer medium; a suitable oil could be used as the primary heat transfer medium where the operating temperature so permits.

Figure 4:
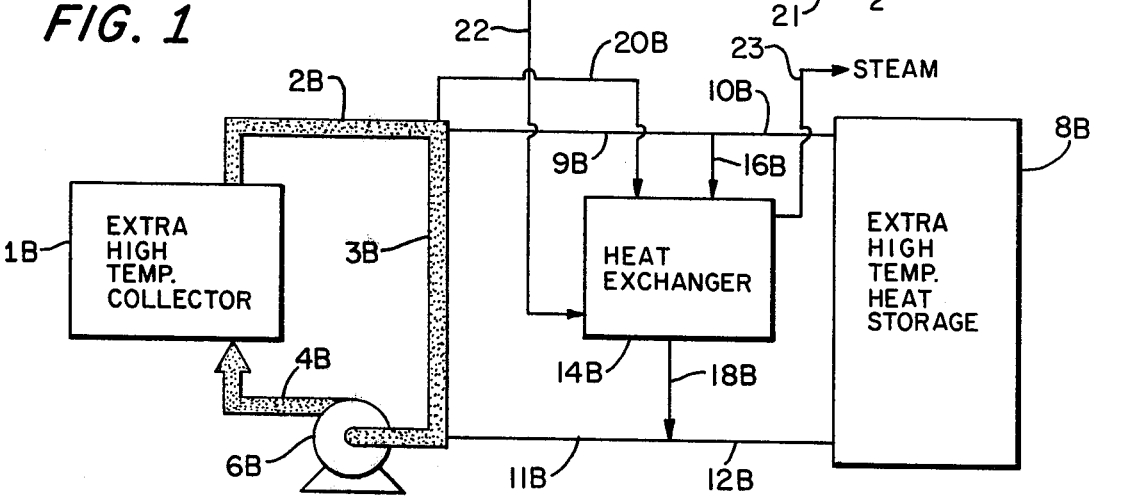
FIG. 4 is a diagram illustrating the controls required for operating the system of FIG. 2 according to the method of this invention.

Referring now to FIG. 4, operation of the system of FIG. 2 may be automated by means of a computer 130 which may be preprogrammed to automatically adjust the position of the heliostats in accordance with signals received from a solar tracking unit 132 and by means of control signals applied to a heliostat tracking unit 134. Additionally one or more temperature sensors 136 sense the temperatures of the primary heat transfer medium at the collector heat exchanger 1A and 1B and provide data signals which are processed by the computer according to a predetermined program to generate control signals for operating the several control valves 54, 58, etc. according to whether there is an absence or presence of solar radiation and whether or not heat is required to be transferred to or removed from storage. The computer also provides signals for operating a door operator unit 138, so that automatically the doors 50A and 50B are opened during sunlight and are closed during nightime and prolonged periods of radiating-occluding cloud cover.

Figure 5:
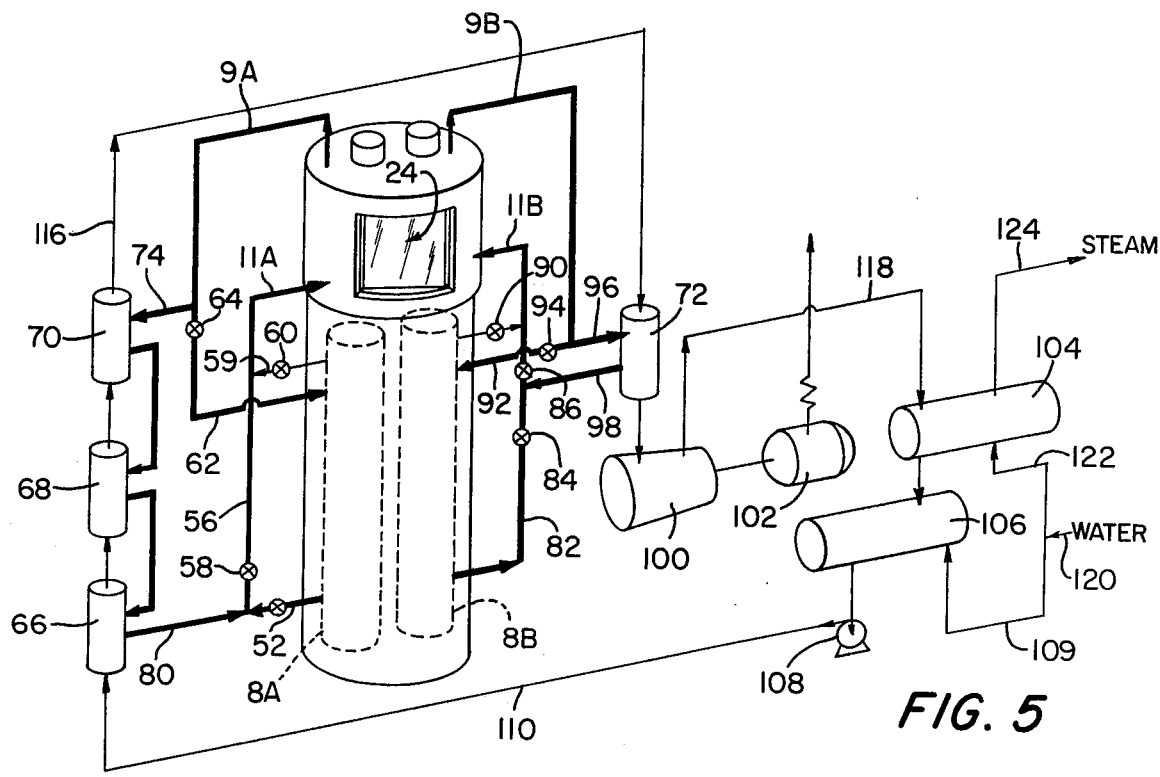
FIGS. 5 and 6 are like FIG. 2 but illustrate different operating modes of the system.

FIG. 5 illustrates operation of the system of FIG. 2 during a period of sunlight sufficiently intense for excess heat to be available for storage in heat reservoirs 8A and 8B. During such period, the doors 50A and 50B are open full so as to expose the full target area of collector 24. Valves 60 and 90 are closed and the rest are opened, whereby the primary fluid heat transfer medium is forced by the pumps 6A and 6B to follow the paths represented by the bold lines. Thus relatively cold heat transfer medium is removed from the bottom of storage units 8A and 8B and fed via lines 56, 11A and 82, 11B to the input ends of the heat exchangers 1A and 1B of collector 24. Hot heat exchange medium is removed from the recycle loop 2A, 3A, 4A of exchanger 1A by line 9A and some of it flows via line 74 to heat exchangers 70, 68 and 66 in turn, while the remainder is passed by line 62 back into the upper end of storage unit 8A. The fluid heat transfer medium discharged from exchanger 66 is returned to the collector via lines 80, 56 and 11A. At the same time hot heat storage medium is removed from the recycle loop 2B, 3B, 4B of collector exchanger 1B by line 9B and some of it is fed by line 96 to heat exchanger 72, while the remainder is passed by line 92 back into the upper end of storage unit 8B. The relatively cold medium from exchanger 72 is returned to the collector via lines 98 and 11B. If desired, particularly where the volume or capacity of storage unit 8B is relatively large so that more than enough heat is stored therein during an average day of abundant daylight to take care of the heat required for reverse nightime operation, the foregoing operation may be modified to the extent of closing valves 84 and 94, whereby all of the heat recovered in collector heat exchanger 1B is utilized in heat exchanger 72.

Figure 6:
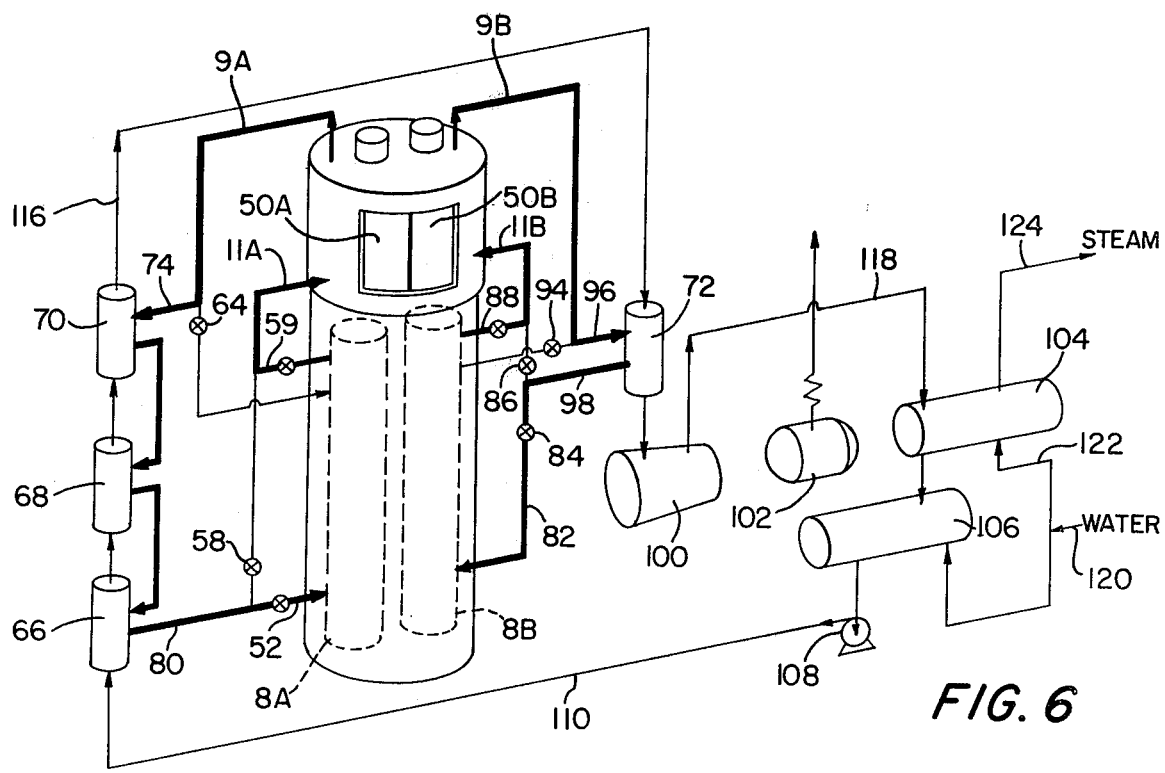

FIG. 6 illustrates operation of the same system commencing at sunset. For this mode of operation, valves 58, 64, 86 and 94 are closed and the remainder are open. Additionally, if doors 50A and 50B or equivalent are provided, they should be moved to a closed position as shown in FIG. 6 so as to reduce loss of heat by the collectors by radiation to the surrounding environment. During night time, hot primary heat transfer medium accumulated during the day in storage units 8A and 8B is removed from those storage units via lines 59, 11A and 88, 11B and pumped through the collector heat exchangers in the receiver for the purpose of maintaining the temperature of the collector at substantially the same level as it was during day time operation. The heat transfer medium is removed by lines 9A and 9B from the loops 2A, 3A, 4A and 2B, 3B 4B respectively and is passed via lines 74 and 96 to the heat exchangers 70 and 72. After indirect heat exchanger with the secondary fluid in exchangers 70, 68 and 66, relatively cool heat transfer medium is returned to storage unit 8A via lines 80 and 52. Relatively cool heat transfer medium exiting from exchanger 72 is returned to storage unit 8B via lines 98 and 82.

Although not shown, the system of FIGS. 2, 5 and 6 also may be adjusted to compensate for periods when little or no solar radiation is received by the collector due to cloud cover. If the cloud cover is only momentary, the doors 50A and 50B may remain open, and the operation is the same as for uninterrupted sunlight, except that whatever additional heat is required to drive the turbine 100 and to maintain the collector at its desired operating temperature is provided by removing relatively hot heat transfer medium from the storage units via lines 59 and 88 and passing it through the collector and the heat exchangers at the same time that heat transfer medium is being returned to the collector heat exchangers via lines 80, 56 and 11A and lines 98 and 11B. The cooled heat exchanger medium is returned to storage units 8A and 8B via lines 80 and 52 and lines 98 and 82 respectively.

It is to be understood that the valves 54, 58, 64 etc., may be on-off valves and the rates of flow in the two circulating systems fixed by the sizes of the conduits, but preferably variable flow valves are used whereby the rates of flow in the various lines may be adjusted to provide optimum energy use at all times of the day. Of course, the rate of flow of the secondary working fluid also may be adjusted to provide most efficient operation of turbine 100.

The system of FIG. 2 is preferably operated using different eutectic salts in the circuits of collector heat exchangers 1A and B, with the temperature inlet and outlet temperatures of collector 1A being maintained at about 950° F. and 1000° F. respectively during periods of high intensity sunshine and at about 980° F. and 950° F. respectively during periods of darkness; the inlet and outlet temperatures of collector 1B are kept at about 1150° F. and 1200° F. respectively during periods of sunshine and at about 1175° F. and 1150° F. respectively during periods of darkness, whereby the average temperatures of the two collector heat exchangers are kept substantially constant at all times.

Obviously, the apparatus of FIGS. 2, 5 and 6 may be modified by having more than two heat exchangers in the collector 24, in which case the number of circulating systems for the primary heat transfer medium and the number of heat storage units will be correspondingly increased. At the same time the number of secondary fluid heat exchanger stages is correspondingly increased and appropriate controls are provided for the additional fluid heat transfer medium circulating systems.

It is also to be understood that the working fluid may be a material in vapor form, or a material which is converted from a liquid state to a vapor state as a result of its exchange of heat with the primary fluid heat transfer medium. However, the system is best utilized with a primary fluid heat transfer system which remains a liquid at all points in its circulating system. Other variations and modifications of the invention will be obvious to persons skilled in the art.

What is claimed is:

1. A process for utilizing solar energy comprising at least two different cycles of operation as follows:

(a) during periods of sunlight, absorbing solar energy in a collector characterized by first and second solar energy-absorbing heat exchangers of the type through which a fluid heat transfer medium may be circulated, continuously passing first and second fluid heat transfer media in a first direction through said first and second heat exchangers so as to pick up heat therefrom, continuously passing the heated first fluid heat transfer medium from said first heat exchanger through a third heat exchanger so as to give up heat to said third heat exchanger and through a first heat storage reservoir so as to store heat in said first heat storage reservoir, continuously passing the heated second fluid heat transfer medium through a fourth heat exchanger so as to give up heat to said fourth heat exchanger and through a second heat storage reservoir so as to store heat in second heat storage reservoir, and passing a third fluid heat transfer medium through said third and fourth heat exchangers so that said third heat transfer medium recovers heat by indirect heat exchange with said first and second heat transfer media; and (b) during periods when the sun's rays are substantially occluded, continuously passing heated first fluid heat transfer medium for said first heat storage reservoir through said first solar energy-absorbing heat exchanger and said third heat exchanger so as to give up heat to said first and third heat exchangers, and continuously passing heated second fluid heat transfer medium from said second heat storage reservoir through said second solar energy-absorbing heat exchanger and said fourth heat exchanger so as to give up heat to said second and fourth exchangers.

2. A process according to claim 1 comprising continuously recycling some of the heated first fluid heat transfer medium passing out of said first heat exchanger back into said same heat exchanger via a first recycle loop, and continuously recycling some of the heated second fluid heat transfer medium passing out of said second heat exchanger back into said same heat exchanger via a second recycle loop.

3. A process according to claim 1 wherein during periods of sunlight said first and second heat transfer media are circulated so that they are at temperatures $t_1$ and $t_3$ respectively as they leave said first and second solar energy-absorbing heat exchangers respectively and are at temperatures $t_2$ and $t_4$ respectively as they are returned to said first and second solar energy-absorbing heat exchangers, and further wherein during periods when the sun is substantially occluded, said first and second heat transfer media have temperatures $t_5$ and $t_7$ respectively as they leave said first and second heat storage reservoirs and temperatures $t_6$ and $t_8$ respectively as they leave said first and second solar energy-absorbing heat exchangers respectively, with $t_1 > t_2$, $t_3 > t_4$, $t_5 > t_6$, and $t_7 > t_8$.

4. A process according to claim 3 wherein during periods of sunlight the temperature $t_3$ exceeds the temperature $t_1$ and the temperature $t_4$ exceeds the temperature $t_2$.

5. A process according to claim 3 wherein during periods when the sun is substantially occluded the temperature $t_7$ exceeds the temperature $t_5$.

6. A process according to claim 3 wherein during periods when the sun is substantially occluded the temperature $t_8$ exceeds the temperature $t_6$.

7. A process according to claim 2 wherein said first and second heat transfer media are circulated through said loops at a greater volume per unit time than they are circulated through said third and fourth heat exchangers and said first and second heat storage reservoirs.

8. A process according to claim 1 wherein the first and second heat transfer media are the same or different materials.

9. A process according to claim 8 wherein at least one of said first and second heat transfer media is an inorganic salt which is a liquid at the temperature $t_1$ or $t_2$.

10. A process according to claim 1 further including the step of covering the collector during periods when the sun's rays are substantially occluded so as to prevent heat loss from the collector to the surrounding environment.

11. A process according to claim 1 wherein the rate of circulation of said first and second heat transfer media is controlled so that the difference between temperatures $t_1$ and $t_2$ and the difference between temperatures $t_3$ and $t_4$ do not exceed predetermined limits.

12. A process according to claim 1 wherein the first and second heat transfer media are circulated at all times so that the average temperature of the collector is maintained substantially constant.

13. A process according to claim 1 wherein the flow of said first and second heat transfer media is adjusted so as to maintain a substantially constant average temperature in said third and fourth heat exchangers.

14. A system for utilizing solar energy comprising:
 a solar energy collector adapted to receive solar energy and having at least first and second solar energy-absorbing heat exchangers of the type through which a fluid heat transfer medium may be circulated;
 at least third and fourth heat exchangers of the type through which a fluid heat exchange medium may be circulated;
 first conduit means for circulating a first fluid heat tranfer medium through said first heat exchanger;
 second conduit means for circulating a second fluid heat transfer medium through said second heat exchanger;
 third conduit means for circulating said first fluid heat transfer medium between said first and third heat exchangers;
 fourth conduit means for circulating said second fluid heat transfer medium between said second and fourth heat exchangers;
 at least first and second heat storage reservoirs of the type through which a fluid heat transfer medium may be circulated;
 fifth conduit means for circulating said first fluid heat transfer medium through said first heat storage reservoir;
 sixth conduit means for circulating said second fluid heat transfer medium through said second heat storage reservoir;
 means for removing heat from said third and fourth heat exchangers; and
 means for controlling the circulation of said first and second heat transfer media through said first, second, third, fourth, fifth and sixth conduit means so that
  (1) in the event the solar energy received by the collector is more than is required to be recovered from the third and fourth heat exchangers, the flow of said first and second fluid heat transfer media may be adjusted so that at least some of the solar energy absorbed as heat by said media is stored in said first and second heat storage reservoirs, and
  (2) in the event the solar energy received by the collector provides insufficient heat for the third and fourth heat exchangers, the flow of said first and second fluid heat transfer media may be altered so as to remove heat from said first and second heat storage reservoirs respectively and deliver said heat to said first and second and third and fourth heat exchangers respectively.

15. A system according to claim 14 further including conduit means for circulating a third fluid heat transfer medium through said third and fourth heat exchangers so that said third fluid heat transfer medium is heated by indirect exchange of heat with said first and second fluid heat transfer media.

16. A system according to claim 15 further including a turbo generator and means for circulating said third fluid heat transfer medium through said turbo generator so as to cause said turbo generator to generate electricity.

17. A system according to claim 15 further including means for controlling the rate of flow of said first and second fluid heat transfer media through said third and fourth heat exchangers so as to control the rate of heating of said third fluid heat transfer medium in said third and fourth heat exchangers.

18. A system according to claim 15 further including means for controlling the rate of flow of said first and second fluid heat transfer media through said first and second heat exchangers and said first and second heat storage reservoirs.

19. A system according to claim 14 wherein said collector is disposed in a housing having an aperture through which solar radiation may pass to said collector, and further including means for insulating said collector against radiative loss of heat to the environment when the flow of said first and second fluid heat transfer media is altered so as to deliver heat to said first and second and said third and fourth heat exchangers respectively.

20. A system according to claim 14 further including first and second fluid heat transfer media disposed for circulation via said conduit means, at least one of said fluid heat transfer media being a molten salt.

21. A system according to claim 14 wherein said means for controlling the circulation of said first and second heat transfer media through said first, second, third, fourth, fifth and sixth conduit means comprises control valves.

22. A system according to claim 21 wherein said means for controlling the circulation of said first and second heat transfer media through said first, second, third, fourth, fifth and sixth conduit means comprises at least one temperature sensor for detecting the temperature of said first and second heat transfer media at least at said solar energy collector.

23. A system according to claim 22 wherein said means for controlling the circulation of said first and second heat transfer media through said first, second, third, fourth, fifth and sixth conduit means comprises programmable means adapted to process information collected by said at least one temperature sensor and selectively open up or close off said control valves.

24. A system for collecting solar energy and using it to heat a working fluid, said system including:
 at least one heliostat for reflecting an incident beam of radiant solar energy;
 an energy receiver for receiving an incident beam of radiant solar energy reflected by said at least one heliostat and converting said received solar energy to heat, said receiver including first and second heat exchangers adapted to conduct a heat exchange fluid along a selected path in said receiver so as to absorb heat from solar energy striking the receiver;
 an output heat exchanger comprising at least a steam generator section and a steam superheater section;
 a heat storage section comprising first and second tanks each adapted to store a hot fluid heat transfer medium so as to substantially prevent loss of heat from said medium;

first conduit means connecting said first heat exchanger with said steam generator section and said first tank so as to form a first circuit for circulating a fluid heat transfer medium;

second conduit means connecting said second heat exchanger with said steam superheater section and said first tank so as to form a second circuit for circulating a fluid heat transfer medium;

a first fluid heat transfer medium in said first tank, said first heat exchanger, said steam generator section and said first conduit means;

a second fluid heat transfer medium in said second tank, said second heat exchanger, said steam superheater section and said second conduit means;

pump means for circulating a fluid heat transfer means through said first and second circuits; and means for controlling circulation of said first and second fluid heat transfer media whereby (a) during periods of uninterrupted and high intensity sunlight said first and second heat transfer media are circulated so that heat is recovered in said first and second heat exchangers, heat is given up in said steam generator section and said steam superheater section, and heat is stored in said first and second tanks and (b) during periods of darkness said first and second heat transfer media are circulated so that heat is retrieved from said first and second tanks and given up in said first and second heat exchangers, said steam generator and said steam superheater.

25. A system according to claim 24 wherein said first and second conduit means includes first and second recycle loops for recycling said first and second fluid heat transfer media through said first and second heat exchangers respectively without any substantial loss of heat during transit through said recycle loops.

* * * * *

UNITED STATES PATENT AND TRADEMARK OFFICE
CERTIFICATE OF CORRECTION

PATENT NO. : 4265223
DATED : May 5, 1981
INVENTOR(S) : Constantine D. Miserlis et al It is certified that error appears in the above-identified patent and that said Letters Patent are hereby corrected as shown below: